United States Patent
Yamasaki et al.

(10) Patent No.: US 11,666,979 B2
(45) Date of Patent: Jun. 6, 2023

(54) GAS SHIELDED ARC WELDING METHOD

(71) Applicants: Kabushiki Kaisha Kobe Seiko Sho (Kobe Steel, Ltd.), Kobe (JP); Mazda Motor Corporation, Aki-gun (JP)

(72) Inventors: Ryota Yamasaki, Kanagawa (JP); Kazuya Ikai, Kanagawa (JP); Masaaki Tanaka, Hiroshima (JP); Mitsugi Fukahori, Higashihiroshima (JP)

(73) Assignees: Kobe Steel, Ltd., Kobe (JP); Mazda Motor Corooration, Aki-gun (JP)

(*) Notice: Subject to any disclaimer, the term of this patent is extended or adjusted under 35 U.S.C. 154(b) by 236 days.

(21) Appl. No.: 16/660,872

(22) Filed: Oct. 23, 2019

(65) Prior Publication Data
US 2020/0130086 A1  Apr. 30, 2020

(30) Foreign Application Priority Data
Oct. 25, 2018 (JP) .............. JP2018-201245

(51) Int. Cl.
*B23K 9/00* (2006.01)
*B23K 9/16* (2006.01)
(Continued)

(52) U.S. Cl.
CPC ............ *B23K 9/0026* (2013.01); *B23K 9/095* (2013.01); *B23K 9/164* (2013.01);
(Continued)

(58) Field of Classification Search
CPC ...... B23K 9/0026; B23K 9/164; B23K 9/173; B23K 9/23; B23K 9/295; B23K 2103/04; B23K 2101/18
See application file for complete search history.

(56) References Cited

U.S. PATENT DOCUMENTS

2002/0017504 A1* 2/2002 Toyoda .............. B23K 35/0261
                                              219/74
2007/0144620 A1* 6/2007 Soshiroda ............... C22C 38/02
                                              148/320
(Continued)

FOREIGN PATENT DOCUMENTS

JP       5284246 B2      9/2013
JP    2017-126657 A1     7/2017

OTHER PUBLICATIONS

ER309 Solid Welding Wire; https://atlanticweldings.com/product/er309-solid-welding-wire/ (Year: 2022).*

(Continued)

*Primary Examiner* — Justin C Dodson
(74) *Attorney, Agent, or Firm* — Oblon, McClelland, Maier & Neustadt, L.L.P.

(57) ABSTRACT

A gas shielded arc welding method includes welding a steel sheet with a tensile strength of 780 MPa or more using a shielding gas containing Ar in an amount of 92 vol. % to 99.5 vol. %. In the gas shielded arc welding method, a value calculated from the following expression (1) is 0.20 or more: $\{\sqrt{v}/(D/2)^2\} \times 10 - \{(100-C_{Ar}) \times I/v\} \times 0.1 \ldots$ (1), where $C_{Ar}$ represents an Ar content (vol. %) in the shielding gas, D represents an inner diameter (mm) of a nozzle from which the shielding gas is supplied, v represents a welding speed (cm/min), and I represents a welding current (A).

20 Claims, 2 Drawing Sheets

(51) Int. Cl.
*B23K 9/095* (2006.01)
*B25J 11/00* (2006.01)
*B23K 101/18* (2006.01)
*B23K 103/04* (2006.01)

(52) U.S. Cl.
CPC ...... *B23K 2101/18* (2018.08); *B23K 2103/04* (2018.08); *B25J 11/005* (2013.01)

(56) References Cited

U.S. PATENT DOCUMENTS

| | | | |
|---|---|---|---|
| 2015/0027995 A1* | 1/2015 | Izutani | B23K 9/025 |
| | | | 219/146.1 |
| 2017/0165793 A1* | 6/2017 | Barhorst | B23K 35/0266 |
| 2018/0021871 A1* | 1/2018 | Srinivasan | B23K 9/173 |
| | | | 219/137 R |
| 2018/0221982 A1* | 8/2018 | Miyata | B23K 9/23 |
| 2018/0369945 A1 | 12/2018 | Kodama et al. | |

OTHER PUBLICATIONS

Yamasaki, R, et al., "Low-Slag Welding Process for improve electrodeposition coating property of welded join of Ultra High Tensile Strength Steel", Kabushiki Kaisha Kobe Seiko Sho (Kobe Steel, Ltd.), Mazda Motor Corporation, 7 pages(with English Translation).

* cited by examiner

GAS SHIELDED ARC WELDING METHOD

CROSS-REFERENCE TO RELATED APPLICATIONS

This application claims priority from Japanese Patent Application No. 2018-201245 filed on Oct. 25, 2018, the entire subject matter of which is incorporated herein by reference.

BACKGROUND OF INVENTION

Technical Field

The present invention relates to a gas shielded arc welding method for welding a steel sheet with a tensile strength of 780 MPa or more while supplying a shielding gas.

Background Art

In the field of automobiles or the like, a high tensile strength steel (HTSS) sheet has been frequently used for the purpose of weight reduction and welding of a high tensile strength steel sheet has been developed from various standpoints. For example, Patent Literature 1 proposes a solid wire for welding intended to improve tensile strength and cold cracking resistance of a weld metal by suitably adjusting contents of metals contained in the wire and controlling the value obtained from the specific expression using the contents.

Patent Literature 1: Japanese Patent No. 5284246

SUMMARY OF INVENTION

In general, slag on molten metal repeats a behavior that the slag aggregates and enlarges with the progress of welding and is captured with a solidification interface when the size of the slag reaches a specific size. In this manner, the slag is formed in a scattered state on weld metal or at a toe of a bead. The slag is an oxide mainly including Si and Mn. Thus, when the slag adheres on the weld metal, electrodeposition coating after the welding becomes defective and corrosion resistance is deteriorated.

Underbody components applied to automobiles or the like are exposed to corrosive environment and required to have high corrosion resistance. When the corrosion resistance of the underbody components are deteriorated, corrosion progresses due to water-wetting or the like, whereby corrosion wastage occurs locally in a steel sheet. Fatigue characteristics of the components therefore are deteriorated with respect to an impact from a road surface or transmission of a driving force.

Contents of Si and Mn in a high tensile strength steel sheet is larger than those in a mild steel sheet, and thus, slag formed during welding tends to increase. In this case, defective coating likely occurs in the electrodeposition coating describe above, and thus it becomes difficult to prevent the slag formation when a wire disclosed in Patent Literature 1 is used. Accordingly, a method, which can improve an electrodeposition coating even in the case of welding a high tensile strength steel sheet, has been demanded.

The present invention was made based on these circumstances, and an object thereof is to provide a gas shielded arc welding method which can prevent defect of electrodeposition coating after welding and can improve corrosion resistance of structural members.

The present inventors have focused on an oxide film (oxide mainly including iron) uniformly formed in film form on weld metal and found that slag can be buried in the oxide film by allowing the slag to be positively captured with a solidification interface before the slag formed during welding aggregates and enlarges. That is, the present inventors have found that the slag formed with the progress of welding should not be grown but it is important to allow the slag to be uniformly buried in the oxide film in a state where the size of the slag is small.

Further, the present inventors have found that, in addition to the aforesaid findings, it is also important to reduce the amount of the slag formed during the welding. The present invention has been made based on these findings.

That is, the gas shielded arc welding method in the present invention includes welding a steel sheet with a tensile strength of 780 MPa or more using a shielding gas containing Ar in an amount of 92 vol. % to 99.5 vol. %, and a value calculated from the following expression (1) is 0.20 or more, $$\{\sqrt{v}/(D/2)^2\} \times 10 - \{(100-C_{Ar}) \times I/v\} \times 0.1 \ldots \quad (1)$$

where $C_{Ar}$ represents an Ar content (vol. %) in the shielding gas, D represents an inner diameter (mm) of a nozzle from which the shielding gas is supplied, v represents a welding speed (cm/min), and I represents a welding current (A).

In the above gas shielded arc welding method, the D is preferably 10 mm to 16 mm.

In the above gas shielded arc welding method, the v is preferably 30 cm/min to 200 cm/min.

The present invention can provide a gas shielded arc welding method which can prevent defect of electrodeposition coating after welding and can improve corrosion resistance of structural members.

DESCRIPTION OF EMBODIMENTS

Figure 1:
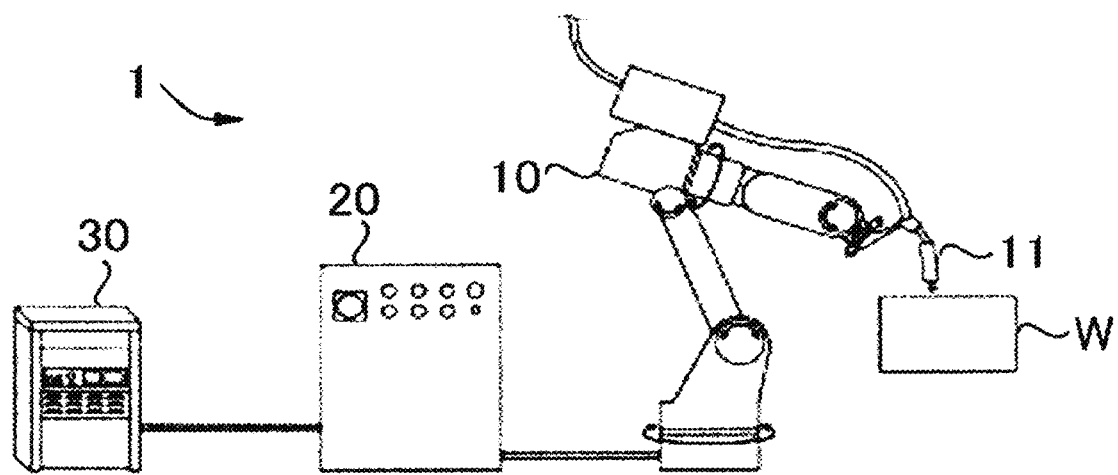
FIG. 1 illustrates an entire configuration of a welding apparatus, as an example thereof, which is used in a welding method according to the present invention.

Embodiments of the present invention are described in detail below. The present invention is not limited to the embodiments described below and may be modified optionally and implemented within a range not departing from the gist of the present invention.

As a result of intensive studies made by the present inventors for achieving a gas shielded arc welding method which can achieve electrodeposition coating after welding in a good state by allowing small-sized slag to be buried in an oxide film and reducing the amount of the slag formed during the welding, the present inventors have found that it is effective to suitably control an Ar content in a shielding gas, an inner diameter of a nozzle from which the shielding gas is supplied, and a welding speed and a welding current.

Hereinafter, in the gas shielded arc welding method in the present embodiment, detailed explanations are made as to influence on slag by controlling an Ar content in a shielding gas, an inner diameter of the nozzle from which the shielding gas is supplied, and a welding speed and a welding current, and also as to a relational expression for controlling a relation of these factors.

[Gas Shielded Arc Welding Method]

The gas shielded arc welding method in this embodiment includes welding a steel sheet with a tensile strength of 780 MPa or more using a shielding gas containing Ar in an amount of 92 vol. % to 99.5 vol. %, and a value calculated from the following expression (1) is 0.20 or more, $$\{\sqrt{v}/(D/2)^2\}\times 10 - \{(100-C_{Ar})\times I/v\}\times 0.1 \quad \ldots \quad (1)$$

where $C_{Ar}$ represents an Ar content (vol. %) in the shielding gas, D represents an inner diameter (mm) of a nozzle from which the shielding gas is supplied, v represents a welding speed (cm/min), and I represents a welding current (A).

<Shielding Gas>

The shielding gas used in the gas shielded arc welding method in this embodiment is not particularly limited, and a mixed gas of Ar gas and an oxidized gas such as carbon dioxide gas ($CO_2$) or oxygen gas ($O_2$) may be used. These gases may contain inevitable impurities such as $N_2$ and $H_2$ but it is most preferred that these gases do not contain the inevitable impurities at all.

<Ar Content in Shielding Gas: 92 vol. % to 99.5 vol. %>

The Ar content in the shielding gas largely influences an amount of the slag formed in a high-temperature region just beneath an arc. The Ar content in the shielding gas is required to be controlled suitably in order to reduce the amount of slag formed.

When the Ar content in the shielding gas is less than 92 vol. %, it becomes difficult to reduce the amount of slag formed. In contrast, when the Ar content in the shielding gas exceeds 99.5 vol. %, the welding becomes unstable, and thus, a small amount of oxidized gas is required to be contained in the shielding gas. The Ar content is therefore 92 vol. % or more and preferably 94 vol. % or more. Further, the Ar content is 99.5 vol. % or less, preferably 98 vol. % or less, and more preferably 96 vol. % or less.

<Value Calculated from Expression (1): 0.20 or More>

In a method of burying small-sized slag in the oxide film on the surface of the weld metal, it is effective to use high welding speed and increase the flow of the molten metal in a direction opposite to a welding direction. Oxidation reaction at the solidification interface (surface) of the molten metal can be promoted by reducing an inner diameter of a nozzle (nozzle diameter) of a welding torch.

The first term of the expression (1), that is, "$\{\sqrt{v}/(D/2)^2\}\times 10$" represents a value which is related to the formation of the oxide film. The first term means that the higher the welding speed v is or the smaller the inner diameter D of the nozzle is, the oxide film can be more effectively formed, whereby harmful slag can be further captured and thus reduced.

The second term of the expression (1), that is, "$\{(100-C_{Ar})\times I/v\}\times 0.1$" represents a value which is related to the amount of slag formed. The second term means that the smaller a ratio of the oxidized gas (that is, $100-C_{Ar}$) in the shielding gas is or the smaller the heat input is, that is, the smaller a ratio of the welding current I to the welding speed v (that is, I/v) is, the amount of slag formed can be further reduced.

When the value calculated from the expression (1) is 0.20 or more, small-sized slag can be buried in the oxide film and the amount of slag formed during the welding can be reduced, so that the electrodeposition coating after the welding can be achieved in a good state. Thus, the value calculated from the expression (1) is 0.20 or more, preferably 0.40 or more, and more preferably 0.60 or more.

The upper limit of the value calculated from the expression (1) is not particularly limited. However, when this value is too large, it means that the welding speed v becomes excessive or the heat input becomes too small, whereby a bead shape may be defective. The value calculated from the expression (1) is thus preferably 2.20 or less, more preferably 2.00 or less, and further preferably 1.80 or less.

<Inner Diameter D of Nozzle from Which Shielding Gas is Supplied: 10 mm to 16 mm>

As described above, when the inner diameter D of the nozzle from which the shielding gas is supplied is reduced, the supply amount of Ar gas during welding decreases, and thus, the oxidation reaction at the solidification interface of the molten metal can be promoted. This effect can be achieved sufficiently when the inner diameter D of the nozzle is 16 mm or less. The inner diameter D of the nozzle is thus preferably 16 mm or less, and more preferably 14 mm or less.

When the inner diameter D of the nozzle is less than 10 mm, an effective range of the shielding gas becomes small, whereby the shielding may become defective, and thus, mechanical properties of a welding joint may be deteriorated. The inner diameter D of the nozzle is thus preferably 10 mm or more, and more preferably 11 mm or more.

<Welding Speed v: 30 cm/min to 200 cm/min>

The oxide film can be formed effectively by setting the welding speed v to be equal to or more than the specific speed. This effect can be achieved sufficiently when the welding speed v is 30 cm/min or more. The welding speed v is thus preferably 30 cm/min or more, more preferably 60 cm/min or more, and further preferably 80 cm/min or more.

When the welding speed v exceeds 200 cm/min, a welding defect such as burn-through or a poor bead shape may occur. The welding speed v is thus preferably 200 cm/min or less, more preferably 170 cm/min or less, and further preferably 150 cm/min or less.

Next, a welding apparatus, a consumable electrode (welding wire), and other welding conditions, which can be used in the welding method in the present embodiment, and a steel sheet to be welded by the welding method in the present embodiment are described below.

<Welding Apparatus>

The welding apparatus, which can be used in the gas shielded arc welding method in the present embodiment, is not particularly limited as long as it is a welding apparatus for performing gas shielded arc welding, and thus, welding apparatus commonly used for gas shielded arc welding may be used.

For example, as shown in FIG. 1, welding apparatus 1 includes a robot 10, a wire supply unit (not shown) and a welding power supply 30. A welding torch 11 is attached to a distal end of the robot 10. The robot 10 moves the welding torch 11 along a weld line of a material to be welded (also called as "work" or "base metal" in some cases) W. The wire supply unit supplies a welding wire to the welding torch 11. The welding power supply 30 supplies current to a consumable electrode via the wire supply unit, thereby generating an arc between the consumable electrode and the material to be welded. The welding apparatus further includes a robot controller 20 that controls a robot action for moving the welding torch 11.

<Welding Torch>

Figure 2:
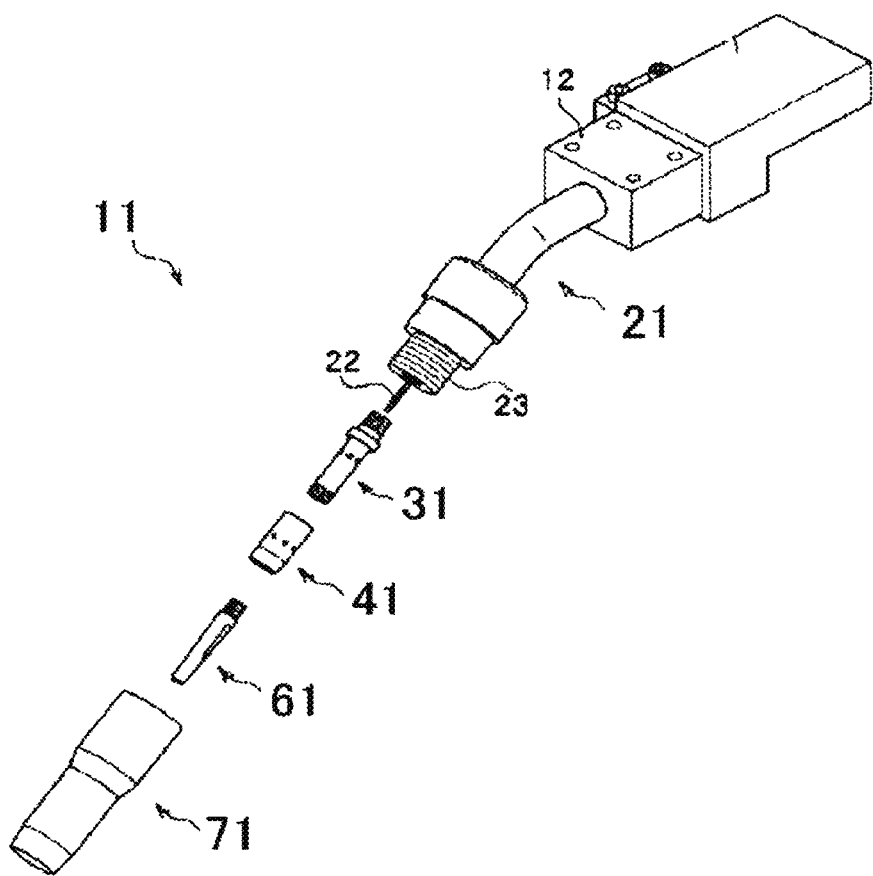
FIG. 2 illustrates a structure of a welding torch, as an example thereof, which is used in the welding method according to the present invention.

As shown in FIG. 2, arc welding is performed by the welding torch 11 using the welding wire which is automatically fed into a tube. A torch clamp 12 is attached to the welding torch 11. The torch clamp 12 is used for fixing the welding torch 11 to the robot.

A torch barrel 21 is supported by the torch claim 12 and includes a mechanism of supporting a nozzle 71 and a tip body 31. The torch barrel 21 can supply the supplied welding wire to a distal end of the tip body 31 (a rear end of a contact tip 61) via an inner tube 22 in a state where the tip body 31 is attached to the torch barrel. The torch barrel 21 supplies welding current to the tip body 31 and also supplies shielding gas to a space formed between the inner tube 22 and the tip body 31. The tip body 31 includes a mechanism of supporting an orifice 41 and the contact tip 61. The tip body 31 is formed of a material having electrical conductivity such as a metal.

The orifice 41 includes a mechanism of laminarizing the shielding gas. That is, the orifice 41 generally has a cylindrical shape and is attached to the tip body 31 by being inserted into the tip body from the distal end side of the outer periphery of the tip body. The contact tip 61 supplies welding current to the welding wire and includes a mechanism which guides the welding wire to a work as a welding target. As with the tip body, the contact tip 61 is formed of a material having electrical conductivity such as a metal.

A posture of the welding torch may be vertical or inclined with respect to the base metal. When the welding torch is inclined toward a direction opposite to a welding direction, an angle formed by the welding torch and a perpendicular line with respect to the base metal is called as an advance angle. When the welding torch is inclined toward the welding direction, an angle formed by the welding torch and the perpendicular line with respect to the base metal is called as a backward angle.

When the welding torch is inclined so as to have the advance angle, shielding properties during the arc welding can be improved more effectively. When an electrode is inclined so as to have the backward angle, the backward portion of a bead can be shielded, whereby oxidation reaction of the bead just after the welding can be prevented.

In order to achieve suitable penetration and good bead shape on a weld line, it is more preferable to perform the welding with the advance angle in a range of −15 degrees to 40 degrees, that is, in a range where the upper limit of the advance angle is set to 40 degrees and the upper limit of the backward angle is set to 15 degrees.

<Nozzle>

The nozzle 71 includes a mechanism of ejecting the shielding gas such as Ar gas or $CO_2$ gas, which is supplied from a gas supply device (not shown), to the base metal as a welding target. The nozzle 71 is formed in a tubular shape having an internal space in which the tip body 31, the orifice 41 and the contact tip 61 in an integrally assembled state can be housed. At an inner surface of a rear end of the nozzle 71, a female screw (not shown) which is engaged with a male screw 23 formed at a distal end of the torch barrel 21 is formed in the nozzle 71. With this configuration, the nozzle 71 can block the welding portion from the atmosphere by using the shielding gas which is laminarized by the orifice 41.

<Consumable Electrode (Welding Wire)>

As the welding wire which may be used in the gas shielded arc welding method in the present embodiment, solid wires commonly used in gas shielded arc welding of a high tensile strength steel sheet may be used. Components contained in the welding wire and contents of the components are not particularly limited. Components which may be contained in the welding wire and preferable ranges (contents) of these components are described below. A content of each component is defined as a ratio of a mass of the component to an entire mass of the welding wire as long as not particularly defined.

<C: 0.30 Mass % or Less (Including 0 Mass %)>

C in the welding wire or weld metal is effective in enhancing the strength of the weld metal. There arises no problem regarding spatter even when the C content is small, and thus, the lower limit of the C content is not set. However, when the C content becomes large and exceeds 0.30 mass %, C combines with a minute amount of oxygen during the welding, and as a result, CO gas is generated. Thus, CO gas bubbles appear on the surface of a droplet, whereby spatter is generated or an arc becomes unstable.

When an arc becomes unstable, shielding gas is disturbed and the atmosphere is sucked into the shielding gas, whereby a large amount of slug may be generated or a welding defect such as a blow hole may occur. The C content is thus preferably 0.30 mass % or less. The C content is preferably 0.01 mass % or more in order to ensure the strength of the weld metal.

<Si: 0.20 Mass % to 2.50 Mass %>

Si in the welding wire is a deoxidizing element and is a preferable element for ensuring the strength and toughness of the weld metal. When an additive amount of Si is small, a blow hole may occur due to poor deoxidation. The Si content is thus preferably 0.20 mass % or more. However, when the Si content becomes large and exceeds 2.50 mass %, slag hard to be removed is generated in large quantity during welding, whereby a welding defect such as slag entrainment occurs. Consequently, the Si content is preferably in a range of 0.20 mass % to 2.50 mass %.

<Mn: 0.50 Mass % to 3.50 Mass %>

As with Si, Mn in the welding wire exerts an effect as deoxidant or sulfur scavenger and is preferable for ensuring the strength and toughness of the weld metal. The Mn content is preferably 0.50 mass % or more in order to prevent occurrence of a welding defect due to poor deoxidation. However, when the Mn content becomes large and exceeds 3.50 mass %, slag hard to be removed is generated in large quantity during welding, whereby the welding defect such as the slag entrainment may occur. Further, the strength of the weld metal becomes too large, and thus, the toughness of the weld metal may be deteriorated remarkably. Consequently, the Mn content is preferably in a range of 0.50 mass % to 3.50 mass %.

<P: 0.0300 Mass % or Less (Including 0 Mass %)>

P is an impurity element, and the P content is desirably reduced as little as possible. Thus, the lower limit of the P content is not set. When the P content becomes large and exceeds 0.0300 mass %, a welding defect such as crack of the weld metal may occur. The P content is thus preferably 0.0300 mass % or less (including 0 mass %).

<S: 0.0150 Mass % or Less (Including 0 Mass %)>

S is an impurity element, and the S content is desirably reduced as little as possible. Thus, the lower limit of the S content is not set. When the S content becomes large and exceeds 0.0150 mass %, the welding defect such as crack of the weld metal may occur. The S content is thus preferably 0.0150 mass % or less (including 0 mass %).

The balance of the welding wire are Fe described above, inevitable impurities, and the like. In the welding wire, in addition to the above-described elements, an appropriate amount of Ni, Cr, Mo, B, or any other element is allowed to be added depending on a steel sheet. However, these additive elements are not a dominant factor of the slag formation.

[Arc Welding Conditions]

<Average Welding Current>

When an average welding current is low, a speed of a plasma stream becomes low, and due to such a plasma stream, the atmosphere can be further prevented from being mixed into a portion directly below an arc. The average welding current is therefore preferably 400 A or less, and more preferably 350 A or less.

In terms of the lower limit, the average welding current is preferably 70 A or more in terms of the stability of an arc.

<Pulse Current Control>

As to the welding, pulse welding in which the welding is controlled by a pulse current is preferable from the standpoint that spray transfer can be performed stably, and due to the unstable arc, the atmosphere can be prevented from being sucked into an arc.

A peak value of the pulse current is preferably 380 A or more and 530 A or less, and more preferably 400 A or more and 500 A or less.

When the peak value of the pulse current exceeds 530 A, the peak current is too large, so that there is a possibility that a relatively large amount of the atmosphere may be sucked into an arc. When the peak value of the pulse current is smaller than 380 A, the peak current is too small, so that spatter generation may increase.

A peak time (peak width) of the pulse is preferably 0.5 msec to 2.0 msec, and more preferably 0.7 msec or more and 1.6 msec or less.

When the pulse peak time exceeds 2.0 msec, the peak time is too long, so that there is a possibility that a relatively large amount of the atmosphere may be sucked into an arc. When the pulse peak time is less than 0.5 msec, the peak current is too small, so that the spatter generation may increase.

<Flow Rate of Shielding Gas>

A flow rage of the shielding gas may change depending on the inner diameter D of the nozzle and a distance between the nozzle and the base metal, and the flow rate of the shielding gas is preferably 25 L/min or less, and more preferably 18 L/min or less. With this, a flow velocity of the shielding gas can be prevented from being excessively high and the atmosphere can be prevented from being drawn into shielding atmosphere due to the high-speed gas flow. In terms of porous resistance, a flow rate of the shielding gas is preferably 8 L/min or more, and more preferably 10 L/min or more.

[Steel Sheet with Tensile Strength of 780 MPa or More]

A steel sheet to be welded by the gas shielded arc welding method in the present embodiment is not particularly limited as long as the steel sheet has a tensile strength of 780 MPa or more. For example, the steel sheet may be a high tensile strength steel sheet with a tensile strength of 980 MPa class or more, or a high tensile strength steel sheet with a tensile strength of 1,180 MPa class or more. The tensile strength of the steel sheet is determined by the method in accordance with JIS Z2241 (2011).

A thickness of the steel sheet is not particularly limited and is preferably 1.0 mm to 3.2 mm in terms of welding processing margin.

EXAMPLES

The present invention is described in detail with reference to Examples and Comparative Examples, but the present invention is not limited to these Examples.

The gas shielded arc welding was performed on a high tensile strength steel sheet with a tensile strength of 980 MPa (thickness: 2.0 mm) using a solid wire (780 MPa class) having the composition shown in Table 1 under the welding conditions shown in Tables 2 and 3, thereby obtaining test specimens. "Chemical component composition of wire" in Table 1 represents contents (mass %) of individual components in the consumable electrode (welding wire), and the balance were Fe and inevitable impurities.

Subsequently, as to each of the test specimens of Examples and Comparative Examples after the welding, an appearance of the weld metal was evaluated visually. Evaluation criterion was as follows: the case where the slag spread thinly over the entirety of the weld metal was evaluated as good (○), and the case where the slag aggregated and scattered on the weld metal was evaluated as poor (×). Table 3 represents the evaluation results of the appearances of the weld metal after the welding.

TABLE 1

| Chemical component composition of wire (mass %) | | | | | Diameter |
|---|---|---|---|---|---|
| C | Si | Mn | P | S | (mm) |
| 0.07 | 0.57 | 1.03 | 0.006 | 0.007 | 1.2 |

TABLE 2

| Other welding conditions | |
|---|---|
| Inert gas | Ar gas |
| Oxidized gas | $CO_2$ gas |
| Gas flow rate | 20 L/min |
| Distance between tip and base metal | 15 mm |
| Advance angle/backward angle | 0 degree |
| Welding mode | pulse |
| Base metal steel sheet | 980 MPa class non-plated steel sheet |

TABLE 3

| | No. | Ar content in shielding gas $C_{Ar}$ (vol. %) | Inner diameter of nozzle D (mm) | Welding speed v (cm/min) | Welding current I (A) | Expression (1) | Appearance of weld metal after welding |
|---|---|---|---|---|---|---|---|
| Example | 1 | 95.0 | 13 | 60 | 160 | 0.50 | ○ |
| | 2 | 95.0 | 13 | 120 | 260 | 1.51 | ○ |
| | 3 | 95.0 | 16 | 120 | 260 | 0.63 | ○ |
| | 4 | 95.0 | 16 | 150 | 320 | 0.85 | ○ |
| | 5 | 95.0 | 19 | 150 | 320 | 0.29 | ○ |
| | 6 | 99.5 | 13 | 60 | 160 | 1.70 | ○ |

TABLE 3-continued

| No. | | Ar content in shielding gas $C_{Ar}$ (vol. %) | Inner diameter of nozzle D (mm) | Welding speed v (cm/min) | Welding current I (A) | Expression (1) | Appearance of weld metal after welding |
|---|---|---|---|---|---|---|---|
| Comparative | 1 | 80.0 | 13 | 60 | 160 | −3.50 | x |
| Example | 2 | 100.0 | 13 | 60 | 160 | 1.83 | x |
| | 3 | 95.0 | 16 | 60 | 160 | −0.12 | x |
| | 4 | 95.0 | 16 | 90 | 260 | 0.04 | x |
| | 5 | 95.0 | 19 | 60 | 160 | −0.48 | x |
| | 6 | 95.0 | 19 | 120 | 260 | 0.13 | x |

Expression (1): $\{\sqrt{v}/(D/2)^2\} \times 10 - \{(100 - C_{Ar}) \times I/v\} \times 0.1$ As shown in Table 3, in each of Example No. 1 to No. 6, the Ar content in the shielding gas and the value calculated from the expression (1) were within the range defined in the present invention, so that the slag spread thinly over the surface of the weld metal after the welding and the appearance was good. This means that satisfactory electrodeposition coating can be achieved. In particular, in each of Example No. 1, No. 2 and No. 6, the inner diameter D of the nozzle was within the preferable range defined in the present invention, so that a more excellent state was observed as to the slug on the surface of the weld metal.

Figure 3:
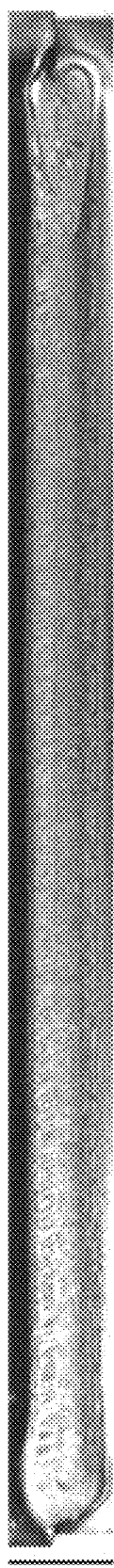
FIG. 3 is a drawing substitute photograph showing an appearance of a bead after welding performed by a gas shielded arc welding method in Example No. 1.

FIG. 3 is a drawing substitute photograph showing an appearance of the bead (weld metal) in Example No. 1 shown in Table 3. As shown in FIG. 3, on the surface of the weld metal in Example No. 1, an aggregate of the slag which inhibits the electrodeposition coating was not found and the slag was spread thinly. A similar appearance was confirmed in each of the other Examples.

In each of Comparative Example No. 1 to No. 6, the Ar content in the shielding gas or the value calculated from the expression (1) was out of the range defined in the present invention, so that the slag aggregated on the surface of the weld metal. This means that satisfactory coating cannot be achieved in the subsequent electrodeposition coating and corrosion would be cause.

Figure 4:
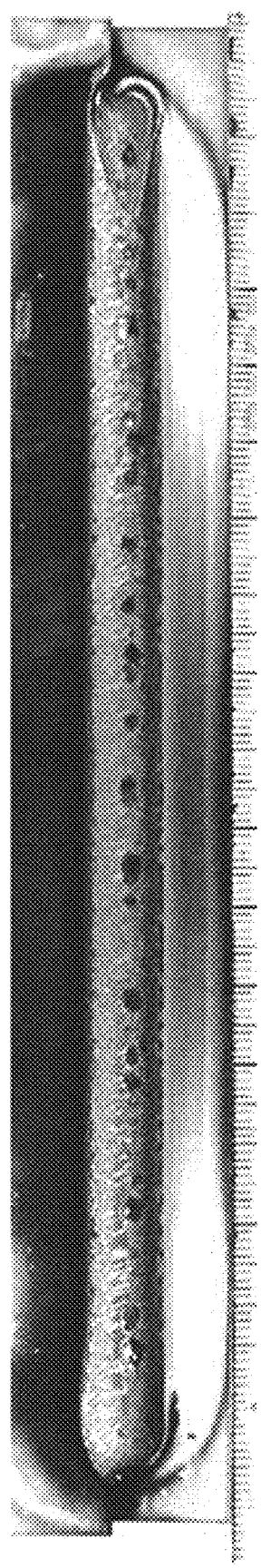
FIG. 4 is a drawing substitute photograph showing an appearance of a bead after welding performed by a gas shielded arc welding method in Comparative Example No. 3.

FIG. 4 is a drawing substitute photograph showing an appearance of the bead (weld metal) in Comparative Example No. 3 shown in Table 3. As shown in FIG. 4, aggregates of the slag were locally scattered on the surface of the weld metal in Comparative Example No. 3. Aggregates of the slag which inhibit the electrodeposition coating were also confirmed in each of the other Comparative Examples.

DESCRIPTION OF REFERENCE NUMERALS AND SIGNS

1 Welding apparatus
10 Robot
11 Welding torch
12 Torch clamp
20 Robot controller
21 Torch barrel
22 Inner tube
23 Male screw
30 Welding power supply
31 Tip body
41 Orifice
61 Contact tip
71 Nozzle
W Material to be welded (work)

The invention claimed is:

1. A gas shielded arc welding method, comprising:
welding a steel sheet with a tensile strength of at least 780 MPa using a shielding gas comprising Ar in an amount in a range of from 92 vol. % to 99.5 vol. %, thereby forming an oxide film on weld metal,
wherein a value calculated from expression (I) is 0.20 or more, $$\{\sqrt{v}/(D/2)^2\} \times 10 - \{(100 - C_{Ar}) \times I/v\} \times 0.1 \ldots \quad (1)$$

wherein $C_{Ar}$, is an Ar content (vol. %) in the shielding gas, D is an inner diameter (mm) of a nozzle from which the shielding gas is supplied, v is a welding speed (cm/min), and I is an average welding current (A),
wherein D is in a range of from 10 to 14 mm, and
wherein the welding comprises burying slag in the oxide film by allowing the slag to be positively captured with a solidification interface before the slag formed during the welding aggregates and enlarges.

2. The method of claim 1, wherein D is in a range of from 11 to 14 mm.

3. The method of claim 1, wherein v is in a range of from 30 cm min to 200 cm/min.

4. The method of claim 2, wherein v is in a range of from 30 cm/min to 200 cm/min.

5. The method of claim 1, wherein the welding comprises contacting the steel sheet with a welding wire, and
wherein a steel alloy of the welding wire comprises no more than 0.30 mass % C.

6. The method of claim 5, wherein the steel alloy of welding wire comprises the C in a range of from 0.01 to 0.30 mass %.

7. The method of claim 1, wherein the welding comprises contacting the steel sheet with a welding wire, and
wherein a steel alloy of the welding wire comprises Si in a range of from 0.20 to 50 mass %.

8. The method of claim 1, wherein the welding comprises contacting the steel sheet with a welding wire, and
wherein a steel alloy of the welding comprises Mn in a range of from 0.50 to 3.50 mass %.

9. The method of claim 1, wherein the welding comprises contacting the steel sheet with a welding wire, and
wherein a steel alloy of the welding wire comprises no more than 0.3000 mass % P.

10. The method of claim 1, wherein the welding comprises contacting the steel sheet with a welding wire, and
wherein a steel alloy of the welding wire comprises no more than 0.0150 mass % S.

11. The method of claim 5, wherein the steel alloy of ding wire comprises the C in a range of from 0.01 to 0.30 mass %,
Si in a range of from 0.20 to 2.50 mass %,
Mn in a range of from 0.50 to 3.50 mass %,
P in no more than 0.3000 mass %, and
S in no more than 0.0150 mass %.

12. The method of claim 1, wherein the Ar is present in the shielding gas in a range of from 94 vol. % to 99.5 vol. %.

13. The method of claim 1, wherein the Ar is present in the shielding gas in a range of from 92 vol. % to 98 vol. %.

14. The method of claim 1, wherein the Ar is present in the shielding gas in a range of from 94 vol. % to 98 vol. %.

15. The method of claim 1, wherein the Ar is present in the shielding gas in a range of from 92 vol. % to 96 vol. %.

16. The method of claim 1, wherein the Ar is present in the shielding gas in a range of from 94 vol. % to 96 vol. %.

17. The method of claim 1, wherein the average welding current (A) is in a range of from 70 to 400 A.

18. The method of claim 1, wherein the average welding current (A) is in a range of from 70 to 350 A.

19. The method of claim 1, wherein the tensile strength of the steel sheet is in a range of from 780 to 1180 MPa.

20. The method of claim 1, wherein the steel sheet is in a range of from 1.0 to 3.2 mm thick.

* * * * *